United States Patent
Stengard et al.

(10) Patent No.: US 12,451,674 B2
(45) Date of Patent: Oct. 21, 2025

(54) POWER DEVICE COMPRISING AN INSULATION GAS FOR USE IN AN ELECTRIC ENERGY POWER ARRANGEMENT

(71) Applicant: Hitachi Energy Ltd, Zürich (CH)

(72) Inventors: Peter Stengard, Ludvika (SE); Richard Thomas, Borlänge (SE); Hauke Peters, Hanau (DE); Loic Fave, Fribourg (CH)

(73) Assignee: Hitachi Energy Ltd, Zürich (CH)

( * ) Notice: Subject to any disclaimer, the term of this patent is extended or adjusted under 35 U.S.C. 154(b) by 0 days.

(21) Appl. No.: 18/721,024

(22) PCT Filed: Dec. 15, 2022

(86) PCT No.: PCT/EP2022/086222
§ 371 (c)(1),
(2) Date: Jun. 17, 2024

(87) PCT Pub. No.: WO2023/111216
PCT Pub. Date: Jun. 22, 2023

(65) Prior Publication Data
US 2024/0421569 A1   Dec. 19, 2024

(30) Foreign Application Priority Data
Dec. 17, 2021   (EP) .................... 21215486

(51) Int. Cl.
*H02B 7/01* (2006.01)
*H01B 3/56* (2006.01)
*H02B 3/00* (2006.01)

(52) U.S. Cl.
CPC .............. *H02B 7/01* (2013.01); *H01B 3/56* (2013.01); *H02B 3/00* (2013.01)

(58) Field of Classification Search
CPC .............. H01B 3/56; H02B 7/01; H02B 3/00
See application file for complete search history.

(56) References Cited

U.S. PATENT DOCUMENTS

| 4,016,382 A | 4/1977 | Roth | |
|---|---|---|---|
| 8,674,253 B2 * | 3/2014 | Uchii | H01H 33/905 218/63 |

(Continued)

FOREIGN PATENT DOCUMENTS

| CN | 102460870 A | 5/2012 |
|---|---|---|
| CN | 105340143 A | 2/2016 |

(Continued)

OTHER PUBLICATIONS

Extended European Search Report dated May 25, 2022 for European Patent Application No. 21215486.8, 10 pages.

(Continued)

*Primary Examiner* — Robert J Hoffberg
(74) *Attorney, Agent, or Firm* — Sage Patent Group

(57) ABSTRACT

A power device includes a gas chamber adapted to include an insulation gas under a set of use conditions including a predetermined installation pressure, and an insulation component including a material in which said insulation gas is soluble and being arranged in relation to said gas chamber so as to be at least partly exposed to said insulation gas when the power device is in said use state. The power device has a delivery state, being a state of said power device before and/or at an installation time at which the power device is installed in said electric energy power arrangement under said set of use conditions including said installation pressure of said insulation gas in said gas chamber, wherein, in said delivery state, said insulation component includes an amount of pre-filled insulation gas which is dissolved in the material of the insulation component.

19 Claims, 4 Drawing Sheets

(56) References Cited

U.S. PATENT DOCUMENTS

| | | | | |
|---|---|---|---|---|
| 10,825,576 | B2* | 11/2020 | Di-Gianni | H02B 1/48 |
| 2016/0043533 | A1* | 2/2016 | Tehlar | H02B 13/035 |
| | | | | 73/19.01 |
| 2023/0184653 | A1* | 6/2023 | Grenier | G01N 33/46 |
| | | | | 73/1.06 |

FOREIGN PATENT DOCUMENTS

| | | |
|---|---|---|
| CN | 112310822 A | 2/2021 |
| EP | 2445068 A1 | 4/2012 |
| WO | 2014173776 A1 | 10/2014 |

OTHER PUBLICATIONS

Abb, "Manual for installation and operation HB 605/04 en; Use of SF6 insulating gas in ZX-Switchgear Gas-Infused medium voltage switchgear," Retrieved from the Internet on May 16, 2022 from: URL:https://library.e.abb.com/public/e2a94701c859e467c1257de4003439ca/HB%20605-04%20en.pdf, 36 pages.

International Search Report and Written Opinion of the International Searching Authority, PCT/EP2022/086222, mailed Mar. 13, 2023, 17 pages.

Written Opinion of the International Preliminary Examining Authority, PCT/EP2022/086222, mailed Nov. 16, 2023, 7 pages.

Notification Concerning Informal Communications with the Applicant, PCT/EP2022/086222, mailed Dec. 4, 2023, 3 pages.

International Preliminary Report on Patentability of the International Preliminary Examining Authority, PCT/ EP2022/086222, mailed Mar. 26, 2024, 19 pages.

Notification of the First Office Action, Chinese Patent Application No. 202280079765.1, mailed Dec. 12, 2024, 10 pages.

* cited by examiner

POWER DEVICE COMPRISING AN INSULATION GAS FOR USE IN AN ELECTRIC ENERGY POWER ARRANGEMENT

CROSS REFERENCE TO RELATED APPLICATIONS

This application is a 35 U.S.C. § 371 national stage application of PCT International Application No. PCT/EP2022/086222 filed on Dec. 15, 2022, which in turn claims foreign priority to European Patent Application No. 21215486.8, filed on Dec. 17, 2021, the disclosures and content of which are incorporated by reference herein in their entirety.

TECHNICAL FIELD

The disclosure relates to a power device for use in an electric energy power arrangement, which power device comprises an insulation component and an insulation gas. The disclosure further relates to a method for manufacturing a power device comprising an insulation component and an insulation gas.

BACKGROUND

Power devices such as switchgear comprising transformers, breakers, disconnectors or other power devices may comprise an insulation gas such as for example SF6, $CO_2$, $O_2$ and/or $N_2$ to improve insulation of the power devices and enable safe operation.

As such, electric energy power arrangements for high voltage environments comprising gas-insulated power devices are designed for operation with a predetermined operation pressure of the insulation gas in the power device. However, it is known that although the predetermined operation pressure of the insulation gas is established at initial installation of the electric energy power arrangement, after a certain time of use, such as after a few months, the gas pressure will have noticeably declined from the predetermined operation pressure. This decline of the gas pressure in the power device continues with time and will eventually result in that the electric energy power arrangement must be refilled with insulation gas, so as to re-establish the desired predetermined operation pressure of the insulation gas. For example, an electric energy power arrangement may require refill of insulation gas within a few years from the initial installation of the electric energy power arrangement.

Thus, there is a desire to remove or reduce the need for refilling of insulation gas after installation of an electric energy power arrangement comprising a power device having a gas chamber filled with insulating gas.

The object of this disclosure is to wholly or partly meet the above-mentioned need.

SUMMARY

The above-mentioned object is achieved by a power device according to the claims.

As such, there is provided a power device for use in an electric energy power arrangement, the power device comprising a gas chamber, wherein the gas chamber is adapted to, when in a use state in the power arrangement, contain within the gas chamber an insulation gas under a set of use conditions, the set of use conditions comprising a predetermined installation pressure of the insulation gas in the gas chamber.

Further, the power device comprises an insulation component comprising a material in which at least some of the insulation gas is soluble, wherein the insulation component is arranged in relation to the gas chamber so as to be at least partly exposed to the insulation gas when the power device is in the use state.

Further, the power device has a delivery state, being a state of the power device before and/or at an installation time at which the power device is installed in the electric energy power arrangement under the set of use conditions comprising the predetermined installation pressure of the insulation gas in the gas chamber.

As proposed herein, in the delivery state, the insulation component comprises an amount of pre-filled insulation gas being dissolved in the material of the insulation component.

Thus, the present disclosure relies on the understanding that the decline in the pressure of the insulation gas in an electric energy power arrangement after installation may at least partly result from the electric energy power arrangement comprising one or more insulation components comprising a material in which the insulation gas is soluble. As the insulation component gradually absorbs dissolved insulation gas after the initial installation of the power arrangement, the amount of insulation gas in the gas chamber decreases and the pressure of the insulation gas in the gas chamber declines.

To alleviate this problem, it is proposed herein to provide a power device wherein one or more insulation components is/are pre-filled with dissolved insulation gas. As such, when the power device is in a delivery state before and/or at an installation time at which the electric energy power arrangement is set up with the desired installation pressure, the insulation component is already at least partly filled with dissolved insulation gas.

As such, the pre-filled insulation component's capacity for absorbing more insulation gas is reduced as compared to a not pre-filled insulation component.

Hence, by providing a power device comprising an insulation component being pre-filled with insulation gas before or/at the installation time of the power arrangement, the decline in gas pressure of the power arrangement comprising the power device after initial installation (i.e. after the installation time) may be reduced.

That the insulation component is prefilled with dissolved insulation gas means that the insulation component comprises at least some dissolved insulation gas.

Optionally, the insulation component comprises an amount of pre-filled insulation gas being such that the pressure of the insulation gas in the gas chamber follows a generally linear decay from the installation pressure, proportional to the time elapsed from the installation time.

It has been found, that for a prior art power device comprising an insulation component not being pre-filled with dissolved insulation gas, the decline of the pressure in the gas chamber initially follows a generally exponential curve after the installation time. Only after a considerable time range, the decline rate of the pressure may slow down so as to follow a generally linear behaviour.

By the insulation component comprising an amount of pre-filled insulation gas as proposed herein, it is possible to ensure that the insulation component is prefilled such that the pressure of the insulation gas in the gas chamber follows a generally linear decay proportional to the time elapsed from the installation time. As such, at least the exponential portion of the pressure decline curve as exhibited by the prior art may be avoided, meaning that the decline in pressure of the power device from the predetermined installation pressure may be considerably reduced as compared to the prior art.

Optionally, the generally linear decay is such that, using a first pressure difference being the difference between the installation pressure and a first pressure value representative of the pressure in the gas chamber at a first instant being a selected time range from the installation time, and a second pressure difference, being the difference between the first pressure and a second pressure, the second pressure value being representative of the pressure in the gas chamber at a second time instant being two subsequent of the selected time ranges, from the installation time, the second pressure difference deviates by less than 10% from the first pressure difference.

Thus, the presence of a generally linear decay may be established using the definition as proposed in the above.

Optionally, the first and/or second pressure value are average values as determined over a predetermined measurement time range so as to be representative of the pressure in the gas chamber at the first or second time instant.

Such average values may be determined over a predetermined measurement time range as determined by a skilled person so as to be representative in view of any pressure measurement fluctuations.

Similarly, the selected time range as used in the above may be determined by a skilled person in view of the expected behaviour of the pressure decline.

For example, the selected time range is at least 5 days.

(With "days" is meant herein "days and nights", i.e. 5 days is equivalent to 5×24 hours.)

Optionally, the power device, when in the delivery state, comprises a removable cover closing the gas chamber. As such, the gas chamber of the power device comprising the insulation component comprising an amount of pre-filled insulation gas may be filled with insulation gas prior to the installation time and the installing of the power device in the power arrangement under the predetermined installation gas pressure. This may enable transport and storage of the power device comprising the pre-filled insulation component under conditions where the gas chamber is filled with insulation gas. This may be of importance for the pre-filling of the insulation component to be maintained under a time period after the pre-filling (which will be further explained in the below), and until the power device is installed under the set of installation conditions as described in the above.

The pre-filled power device may be susceptible to the insulation gas dissolved in the pre-filled power device leaking out again, thus lowering the content of dissolved insulation gas in the pre-filled power device. By ensuring that the gas chamber of the power device is filled with insulation gas also before installation of the power device in the power arrangement, this leakage may be reduced or avoided.

Optionally, when the power device is in the delivery state, the gas chamber comprises the insulation gas under a set of delivery conditions.

For example, the set of delivery conditions may comprise a delivery pressure, the delivery pressure being lower than the installation pressure.

As such, to avoid the problem of dissolved insulation gas leaking out from the pre-filled power device, the power device may be provided in a delivery state wherein the gas chamber comprises insulation gas under a delivery pressure being lower than the installation pressure.

The insulation component may be any insulation component arranged wholly or partly inside the gas chamber.

Optionally, the insulation component may be forming the gas chamber. This may be the case for example for a power device being a circuit breaker, which may comprise a hollow insulation component, the inside of which forming an interior gas chamber of the power device. Typically, the outside of the hollow insulation component may be forming the exterior of the circuit breaker.

The insulation component may comprise any material into which the insulation gas is dissolvable.

Optionally, the insulation component comprises a polymer material. For example, the insulation component may comprise an epoxy material.

The insulation gas may be any insulation gas useful in the art. For example, the insulation gas may comprise SF6 gas, CO2 gas, O2 gas and/or N2 gas. As such, the insulation gas may comprise either one out of the mentioned gases, or any mixture thereof.

In a second aspect, the object is achieved by a method according to the claims.

As such, there is provided a method for manufacturing a power device for subsequent installation in an electric energy power arrangement, the power device comprising a gas chamber, wherein said gas chamber is adapted to, when the power device is in a use state wherein it is arranged for use in the power arrangement, contain within the gas chamber an insulation gas under a set of use conditions, the use conditions comprising a predetermined installation pressure of the insulation gas in the gas chamber, and the power device further comprising an insulation component being arranged in relation to the gas chamber so as to be at least partly exposed to the insulation gas when the power device is in the use state. The insulation component comprises a material in which the insulation gas is soluble.

The method comprises the step of:

subjecting the insulation component to the insulation gas under a set of predetermined gas dissolving conditions for at least a predetermined gas dissolving time period, wherein the predetermined gas dissolving conditions comprise a predetermined gas dissolving pressure being greater than the installation pressure, such that the insulation component is prefilled with an amount of insulation gas being dissolved in the material of the insulation component.

The method is to be performed prior to installing the power device in the use state. The set of predetermined gas dissolving conditions are to be set to promote the dissolving of insulation gas into the insulation component. Accordingly, the result of the method in the above, is an insulation component which is prefilled with dissolved insulation gas, i.e. at least some insulation gas is dissolved into the insulation component as a result of the process. Accordingly, the insulation component being prefilled with dissolved insulation gas will have a lesser capacity for dissolving additional insulation gas, as compared to the insulation component before performance of the method. Thus, when a power device comprising an insulation component being prefilled with insulation gas is set up in a use state under a predetermined installation pressure, the decline in gas pressure of the power device after initial installation (i.e. after the installation time) will be reduced, as intimated in the above in relation to the first aspect.

As mentioned in the above, the set of predetermined gas dissolving conditions are to be set to promote the dissolving of insulation gas into the insulation component. In accordance with the proposed method, the set of predetermined gas dissolving conditions comprises a predetermined gas dissolving pressure being greater than the installation pressure at which the power device is intended to be installed and ideally to be operated when in use. The relatively high predetermined gas dissolving pressure implies that the insulation gas will be dissolved into the insulation component at a higher rate per time unit than e.g. what would be the case if using a lower pressure such as the installation pressure.

Optionally, the set of predetermined gas dissolving conditions and the predetermined gas dissolving time period is such that the insulation component is pre-filled with an amount of the insulation gas to being such that the pressure of the insulation gas in the gas chamber follows a generally linear decay from the installation pressure at the installation time, when subject to the use conditions.

As such, the predetermined gas dissolving conditions may be set such that the insulation component when prefilled comprises an amount of dissolved insulation gas, such that at least the exponential portion of the pressure decline curve as exhibited by the prior art may be avoided. Accordingly, the decline in pressure of the power device from the predetermined installation pressure may be considerably reduced as compared to the prior art.

Optionally, the generally linear decay is such that, using a first pressure difference being the difference between the installation pressure and a first pressure value representative of the pressure in the gas chamber a first time instant from the installation time, and a second pressure difference, being the difference between the first pressure value and a second pressure value, the second pressure value being representative of the pressure in the gas chamber at a second time instant being twice the first time instant, from the installation time, the second pressure difference deviates by less than 10% from the first pressure difference.

Thus, the presence of a generally linear decay may for example be established using the definition as proposed in the above, when the power device comprising the insulation component being prefilled with dissolved insulation gas is set up under the use conditions at the installation time.

Optionally, the first and/or second pressure value are average values as determined over a predetermined measurement time range so as to be representative of the pressure in the gas chamber at the first or second time instant.

Such average values may be determined over a predetermined measurement time range as determined by a skilled person so as to be representative in view of any pressure measurement fluctuations.

Similarly, the selected time range as used in the above may be determined by a skilled person in view of the expected behaviour of the pressure decline.

For example, the selected time range is at least 5 days.

Optionally, the method may comprise the step of forming the power device comprising the insulation component before the step of subjecting the insulation component to the insulation gas under a set of predetermined gas dissolving conditions for at least a predetermined gas dissolving time period. As such, the step of subjecting the insulation component to the insulation gas under the set of predetermined gas dissolving conditions may be performed by filling the gas chamber of the device with the insulation gas under the set of predetermined gas dissolving conditions and under the predetermined gas dissolving time. Thus, it provides an efficient manner of performing the pre-filling of the insulation component with dissolved insulation gas.

As such, the step of subjecting the insulation component to the insulation gas under a set of predetermined gas dissolving conditions for at least a predetermined gas dissolving time period is performed with the insulation component being comprised in the power device and the method may comprise:

filling the gas chamber with the insulation gas and
 maintaining the insulation gas in the chamber under the set of predetermined gas dissolving conditions of the power device for at least the predetermined gas dissolving time period,
 so as to form the power device being in a delivery state wherein the insulation component comprises an amount of pre-filled insulation gas being dissolved in the material of the insulation component before connection to a power arrangement.

In another option, the method may comprise the step of forming the power device after the step of subjecting the insulation component to the insulation gas under a set of predetermined gas dissolving conditions for at least a predetermined gas dissolving time period. By this option, one or more insulation components may be prefilled with dissolved insulation gas, whereafter they are arranged in a gas chamber or are arranged to form a gas chamber in a power device.

Optionally, the set of predetermined gas dissolving conditions comprises a predetermined gas dissolving temperature.

The set of predetermined use conditions may comprise a predetermined use temperature range. Such a predetermined use temperature range may indicate a temperature range within which the power device is intended to operate when in use, and may for example be a temperature range set considering ambient conditions at the location of installation of the power device. The predetermined gas dissolving temperature may optionally be higher than the predetermined use temperature range. As such, the relatively high predetermined gas dissolving temperature may promote gas being dissolved in the insulation component at a higher rate per time unit than e.g. under use conditions.

As intimated in the above in relation to the first aspect, the insulation component may comprise any material into which the insulation gas is dissolvable. Optionally, the insulation component comprises a polymer material. For example, the insulation component comprises an epoxy material. The insulation gas may be any insulation gas useful in the art. For example, the insulation gas may comprise $SF_6$ gas, $CO_2$ gas, $O_2$ gas and/or $N_2$ gas. As such, the insulation gas may comprise either one out of the mentioned gases, or any mixture thereof.

Optionally, the insulation component may comprise a polymer material, which is an epoxy material, and said insulation gas may comprise $CO_2$ gas.

Optionally, the method may further comprise the step of, after the predetermined gas dissolving time period, setting the power device to a set of predetermined storage conditions.

The set of predetermined storage conditions may be different from the set of predetermined gas dissolving conditions.

Alternatively or in addition, the predetermined storage conditions may be different from the predetermined use conditions.

Optionally, the set of storage conditions comprise a storage pressure being less than the predetermined gas dissolving pressure.

Alternatively or in addition, the set of storage conditions comprise a storage pressure being less than the predetermined installation pressure.

As such, the storage pressure may be relatively low pressure.

Optionally, the method may comprise closing the chamber using a removable closure so as to maintain the insulation gas in the chamber in the delivery state of the power component.

By ensuring that the chamber is filled with insulation gas, the tendency for the dissolved insulation gas comprised in the pre-filled power component for leaking out may be reduced.

Thus, the chamber of the power device may be closed by the removable closure such that the set of storage conditions including the storage pressure is maintained in the gas chamber during e.g. transport and storage of the power device.

In a third aspect, there is provided a power device for subsequent installation in an electrical energy power arrangement, and manufactured by a method according to the second aspect.

In a fourth aspect, there is provided a method for arranging a power device according to the first aspect and/or manufactured by the method of the second aspect comprising Installing the power device in an electrical energy power arrangement adapted to be operated at the use conditions.

Optionally, the method may comprise the further steps of, prior to installing the power device in a power arrangement, Storing and/or transporting the power device including a removable closure arranged for maintaining the insulation gas in the chamber in the delivery state of the power device, and Removing the removable closure before installing the power device in a power arrangement.

In a fifth aspect, there is provided an electric energy power arrangement, comprising one or more power devices, out of which at least one power device is in accordance with the first aspect and/or manufactured by a method according to the second aspect.

It is to be understood that features and advantages as described in relation to one of the aspects in the above is equally applicable to each one out of the other aspects.

Further advantages and advantageous features of the disclosure are disclosed in the following description and in the dependent claims.

BRIEF DESCRIPTION OF THE DRAWINGS

With reference to the appended drawings, below follows a more detailed description of embodiments of the disclosure cited as examples.

In the Drawings.

DETAILED DESCRIPTION

Figure 1:
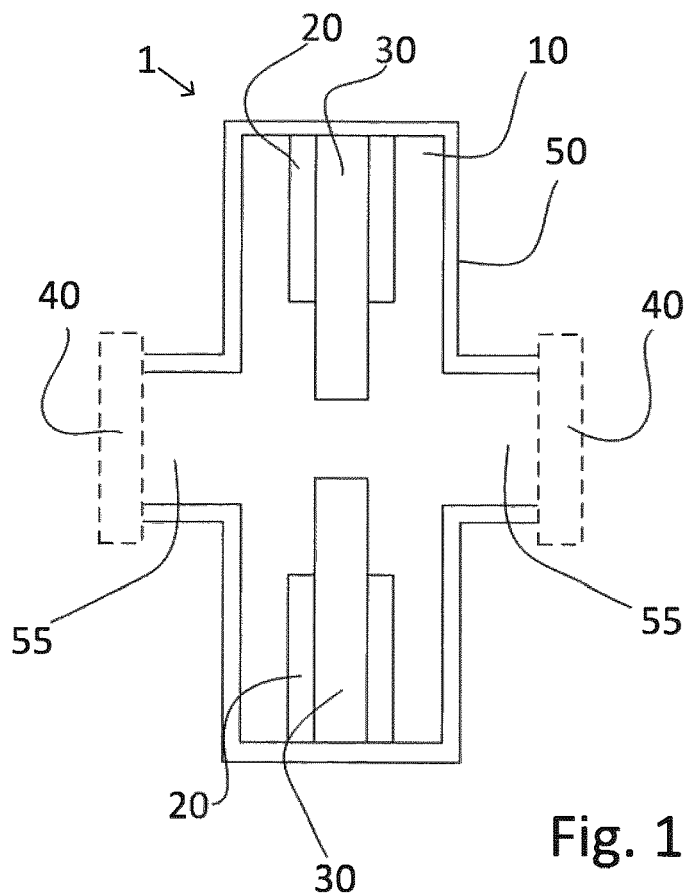
FIG. 1 of is a schematic view of a power device according to an example embodiment of the first aspect the disclosure.

FIG. 1 depicts a schematic cross-sectional view of a power device 1 according to an example embodiment of the disclosure. The example power device 1 comprises an outer housing 50 forming a gas chamber 10 which, when the power device 1 is in use, will be filled with an insulation gas. The power device 1 of FIG. 1 further comprises a pair of conductors, each conductor being arranged in a sleeve forming an insulating component 20 of the power device 1. It is to be understood that the power device 1 is purely schematic and intended only to illustrated the concept of a power device 1 comprising a gas chamber 10 and an insulation component 20. Accordingly, FIG. 1 does not include any details such as power connections etc. of the device 1. As such, the power device 1 may be any kind of power device which is intended to be filled with an insulation gas during use. Thus, the power device 1 may be any device used for gas-insulated switchgear applications. For example, the power device 1 may be any one out of a transformer, capacitor, surge arrestor, breaker or disconnector.

In the schematic illustration of FIG. 1, the power device 1 comprises a housing 50 forming the inner wall of the gas chamber 10, and the insulation components 20 are arranged inside the housing 50.

As such, the housing 50 may be made by any suitable material, for example metal. However, in other applications, such as will be described in the below with reference to FIG. 5, the housing 50 may per se be an insulation component 20, and thus made by an insulating material.

Further, the housing 50 of the power device 1 may be provided with one or more ports 55 to the gas chamber 10. One such port 55 may be adapted for filling the gas chamber 10 with insulation gas.

Figure 2:
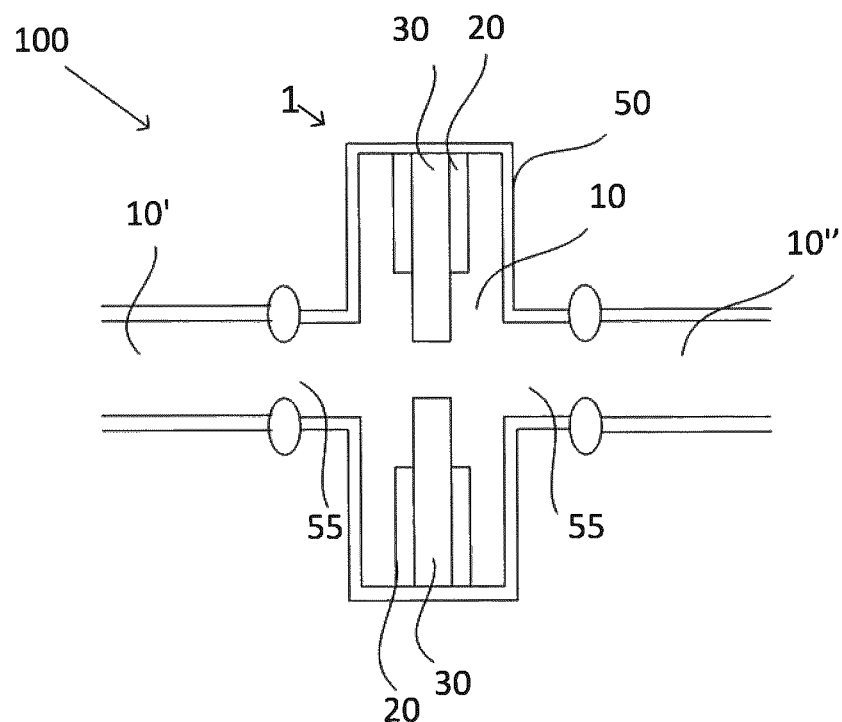
FIG. 2 is a schematical view of the power device of FIG. 1 as arranged in an electric energy power arrangement.
Figure 3:
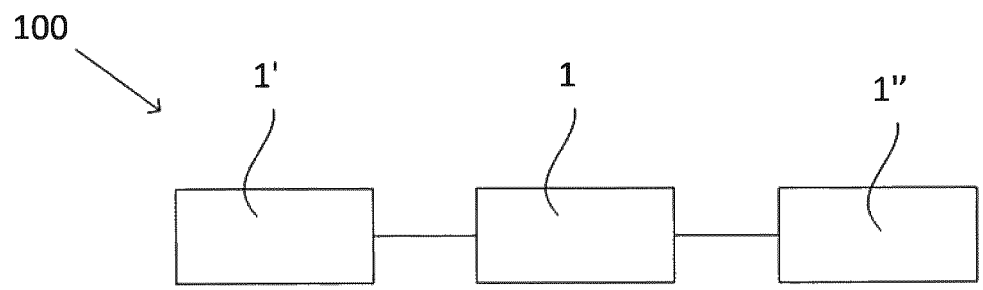
FIG. 3 is a schematical view of an electric energy power arrangement comprising a plurality of power devices.

Further, as is known in the art, the power device 1 may be adapted to be connectable to other power devices 1', 1" also comprising gas chambers 10', 10" as schematically illustrated in FIG. 3, in such a manner that the respective gas chambers 10, 10', 10" of the interconnected power devices 1 are in fluid communication with each other, as schematically illustrated in FIG. 2. To this end, the one or more of the one or more ports 55 may be arranged to be connectable to another power device 1.

In use, the power device 1 is to be arranged in an electric energy power arrangement for high voltage environments. Examples of electric energy power arrangements may be switchgear arrangements, live tank breakers and/or dead tank breakers.

Figure 5:
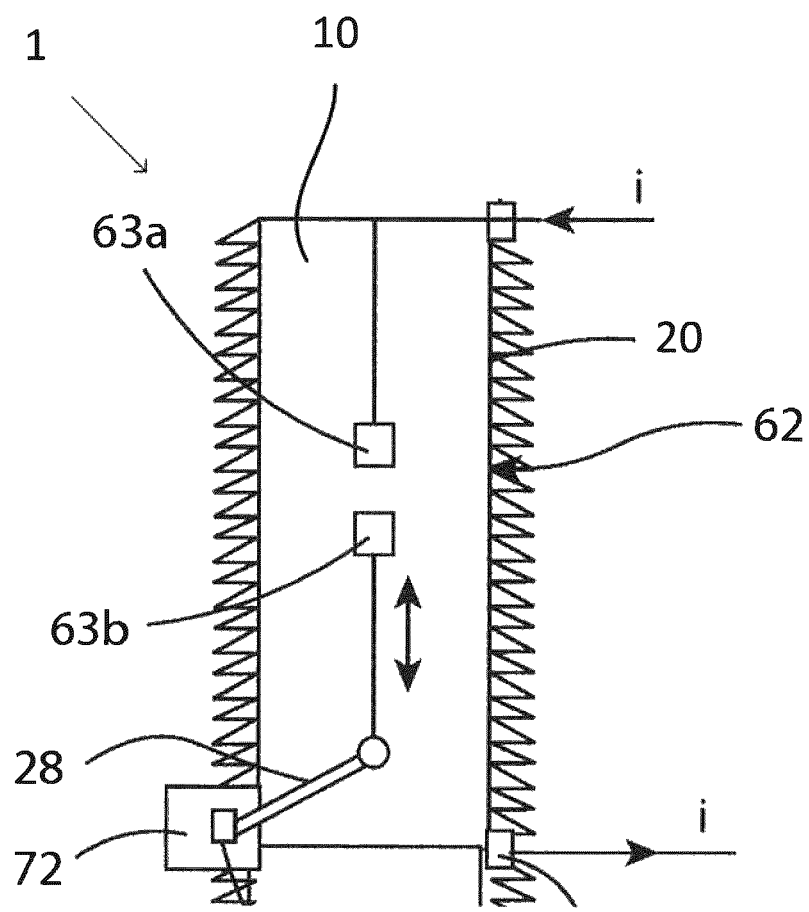
FIG. 5 is a schematical view of a power device according to another example embodiment of the first aspect of the disclosure.

FIG. 5 schematically illustrates another example of a power device 1 for use in an electric energy power arrangement.

As exemplified in FIG. 5, the power device 1 may be a circuit breaker, i.e. an automatically operated electrical switch designed to protect an electrical circuit from damage due to an overcurrent caused by a fault. The power device 1 comprises an interrupter unit 62, which in the example embodiment includes a fixed contact 63a and a movable contact 63b arranged to be movable in relation to the fixed contact between an opened and a closed position. The power device 1 may further comprise an operating mechanism 72 arranged to operate the interrupter unit, i.e. to in the illustrated example move the moveable contact 63b between the opened and closed position by means of a movable arm 28. An insulating component 20 forms an insulating housing enclosing the interrupter unit 62. The insulating component 20 forms a gas chamber 10 which comprises insulation gas. The circuit breaker may further comprise a second insulating component forming a continuation of the insulating housing, for example a second insulating component arranged below the illustrated insulating component and arranged to house power and ground contacts.

As such, the power device 1 illustrated in FIG. 5 is an example of a power device 1 wherein the insulating component 20 forms at least part of the inner wall of the gas chamber 10.

In use, a power device 1 such as those exemplified in the above, is used in an electric energy power arrangement 100. As such, the gas chamber 10 of the power device 1 is adapted to, when in a use set in the power arrangement 100, comprise an insulation gas under a set of use conditions. The use conditions comprise a predetermined installation pressure, being the pressure of the gas in the gas chamber 10 which is set when introducing the gas into the gas chamber.

The insulating gas may be any gas suitable for the application. As such, the gas may for example be SF6 gas, $CO_2$ gas, $O_2$ gas and/or $N_2$ gas.

The insulating component 20 may be made by an insulating material suitable for the application. Suitable insulating materials may for example be a polymer material, such as an epoxy material.

Power devices 1 and electric energy power arrangements 100 such as those generally described in the above are already known in the art. However, and as intimated in the introduction of the application, prior art power devices may suffer from that the pressure in the gas chamber 10, which is initially set to a desired use pressure being equal to the installation pressure of the gas at installation of the electric energy power arrangement 100, declines with time.

Figure 6A:
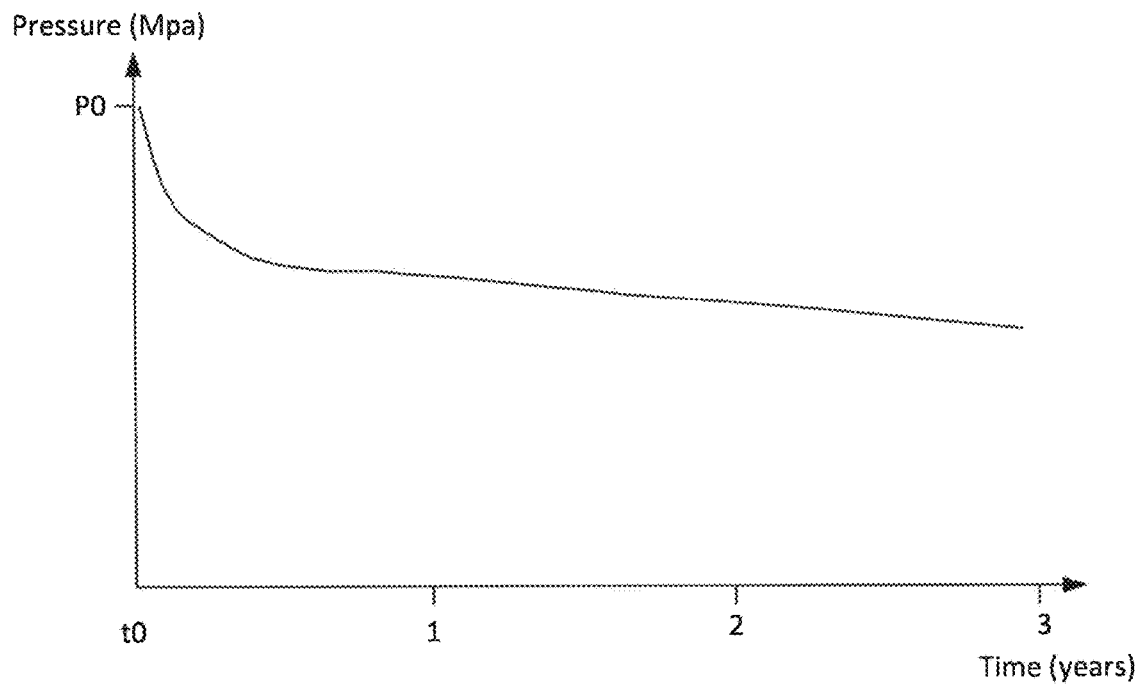
FIG. 6a is a chart illustrating the insulation gas pressure decline in a prior art power device in an electric energy power arrangement.

FIG. 6a illustrate schematically the decline in the pressure in the gas chamber 10 of a power device 1, in this example being a breaker, after an installation time to. As seen in FIG. 6a, during a first time period after the installation time to, the pressure of the insulation gas drops from the installation pressure P0 relatively swiftly, with the pressure decay generally following an exponential curve. After this first time period after the installation time to, the pressure decay rate slows down such that the pressure decay follows a generally linear curve. This pressure decay as exhibited by prior art power devices results eventually in that the pressure in the gas chamber reaches an unacceptably low level. To remedy or to prevent this, it is therefore standard practice to refill the power device with additional gas so as to reassume the installation pressure P0 after some time of operation of the power device. For example, such refill may be planned to take place e.g. 3 to 4 years after installation.

With the power device 1 as proposed herein, the insulation component 20 is pre-filled with dissolved insulation gas prior to the installation of the power device 1 in a power arrangement 100 at the installation time to, at which the gas chamber 10 is set to comprise insulation gas at the desired installation pressure P0.

As proposed herein, when the insulation component 20 comprises a material in which the insulation gas is soluble, the insulation component 20 may be pre-filled with dissolved insulation gas.

Accordingly, there is provided a power device 1 having a delivery state, being a state of the power device 1 before and/or at an installation time to at which the power device is installed in the electric energy power arrangement 100 under a set of use conditions comprising the installation pressure P0 of the insulation gas in the gas chamber. As proposed herein, the insulation component 20 is pre-filled with dissolved insulation gas when in the delivery state.

The power device 1 in its delivery state, i.e. the power device for subsequent installation in an electric energy power arrangement may be manufactured by a method comprising the step of:

Subjecting the insulation component 20 to the insulation gas under a set of predetermined gas dissolving conditions for at least a predetermined gas dissolving time period S10, such that the insulation component 20 is prefilled with dissolved insulation gas.

The predetermined gas dissolving conditions comprise a predetermined gas dissolving pressure being greater than the installation pressure P0.

It has been found by the inventors, that the initial, exponential pressure drop in the pressure chamber 10 as illustrated in FIG. 6a is primarily due to the insulation gas dissolving into the insulation component 20 of the power device 1. Hence, by providing a power device 1 in a delivery state wherein the insulation component 20 is prefilled with dissolved insulation gas, the pressure in the gas chamber 10 of such a power device 1 after the installation time to may be generally linear, as exemplified in FIG. 6b.

Figure 6B:
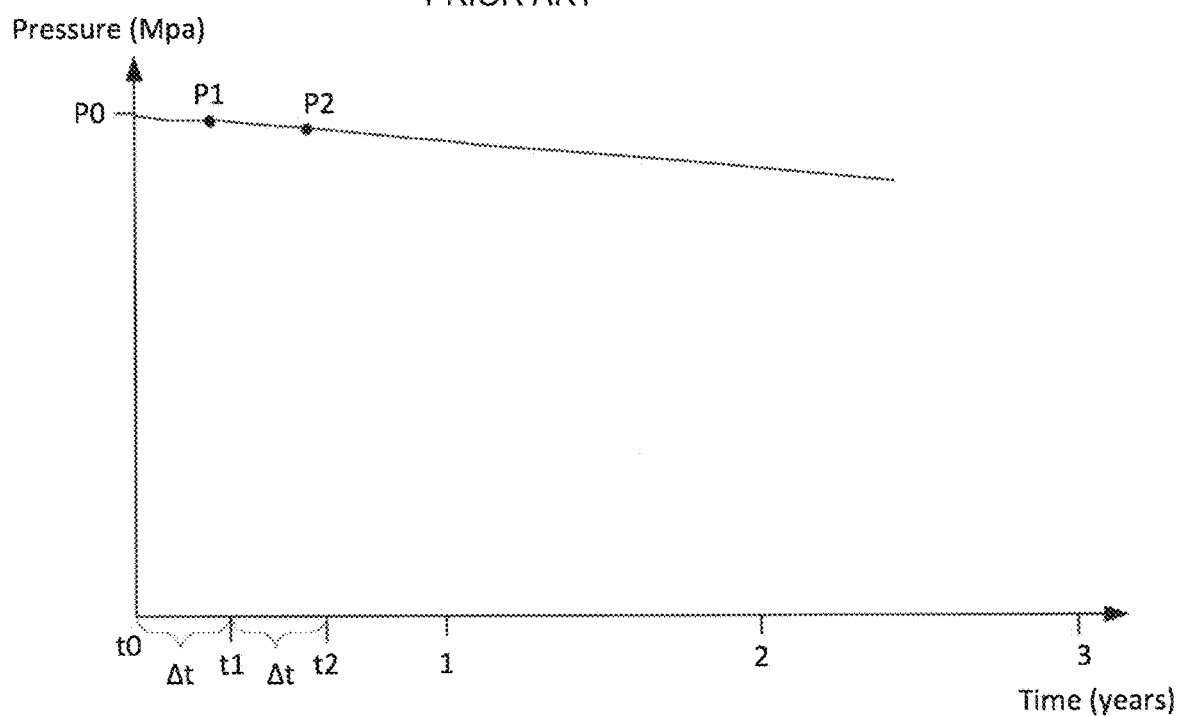
FIG. 6b is a chart illustrating the insulation gas pressure decline in a power device according to the first aspect of the disclosure.

FIG. 6b illustrates as FIG. 6a schematically the decline in the pressure in the gas chamber 10 of a power device 1, in this example being a breaker, after an installation time to at which a desired installation pressure P0 is set up in the insulation gas of the insulation chamber 10 of a power device 1. In FIG. 6b however, the insulation component 20 is pre-filled with dissolved insulation gas. Hence, the decline in the pressure in FIG. 6b is a generally linear decline. It will be understood that by thus avoiding the exponential drop in pressure which may be seen in FIG. 6a, the refill of the power device 1 with additional gas so as to reassume the installation pressure P0 after some time of operation of the power device 1 may be considerably postponed as compared to the prior art device, or the need for refill may be completely removed.

As mentioned in the above, the method comprises subjecting the insulation component 20 to the insulation gas under a set of predetermined gas dissolving conditions for at least a predetermined gas dissolving time period. The predetermined gas dissolving conditions and the predetermined gas dissolving time period may be determined so as to arrive at a desired insulation component 20 being pre-filled with dissolved insulation gas.

In particular, the predetermined gas dissolving conditions may be set so as to promote gas dissolving into the insulation component 20 at a higher rate per time unit than what would be the case under normal use conditions of the power device.

To this end, the predetermined gas dissolving pressure may be greater than the installation pressure P0.

Also, the predetermined gas dissolving conditions may comprise a predetermined gas dissolving temperature, being higher than an intended use temperature range of the power device 1.

The predetermined gas dissolving conditions and the predetermined gas dissolving time suitable for a power device may be empirically determined for a specific power device. For example, parameters such as the volume of the insulating member, the volume of the insulation chamber, the material of the insulating member and the type of insulation gas may be relevant for the result.

For example, in a power breaker, wherein the insulation component comprised glass fiber reinforced epoxy and where the insulation gas was $CO_2$, the method was performed with a predetermined gas dissolving promoting pressure of 11.2 bar and a predetermined gas dissolving promoting time of 3 months. The temperature was 22 degrees Celsius. The volume of $CO_2$ gas in the power breaker was 3.52 l, the area of the glass fiber reinforced epoxy was 0.175 m2, and the thickness of the glass fiber reinforced epoxy was 0.0065 m. The result of the method was a power breaker which, when set under use conditions displayed a linear gas pressure decay as described in the above.

The predetermined gas dissolving promoting time may be dependent on factors such as the geometry of the insulation component. Generally, the predetermined gas dissolving promoting time may be shorted by using a higher predetermined gas dissolving promoting pressure and/or a higher temperature.

As set out in the above, the method may be performed such that the insulation component is pre-filled with insulation gas to such a degree that the pressure of the insulation gas in the gas chamber 10 follows a generally linear decay from the installation pressure P0 at the installation time, when subject to the use conditions.

To determine whether the power device 1 comprising a pre-filled insulation component 20 displays a generally linear decay from the installation pressure P0, the power device 1 comprising the pre-filled insulation component 20 in a delivery state is hence set up under the intended use conditions. The installation time to is the initial time at which the use conditions, including the installation pressure P0 of the insulation gas, is set up for the power device 1. Then, the power device 1 is left without any adjustment to the pressure in the gas chamber 10 for some time, while the pressure in the chamber may be measured.

To determine whether the pressure decay in the gas chamber 10 after the installation time to is generally linear, different methods may be applied.

For example, with reference to FIG. 6b, a first pressure value P1 representative of the pressure in the gas chamber 10 at a first instant t1 being a selected time range delta t from the installation time to is measured. Then, a second pressure value P2 representative of the pressure in the gas chamber 10 at a second time instant t2 being two subsequent of the selected time ranges delta t, from the installation time to.

A first pressure difference deltaP1 being the difference between the installation pressure P0 and the first pressure value P1 is determined, and a second pressure difference deltaP2, being the difference between the first pressure value P1 and the second pressure value P2 is determined. If the second pressure difference deltaP2 deviates by less than 10% from the first pressure difference deltaP1, the pressure decay may be determined to be generally linear.

The time range to the first time instant may be selected to be relevant for the power device and its use conditions. For example, the first time instant may be at least 5 days from the installation time to. For example, the first time instant may be 5 days.

The first and/or second pressure values may be average values as determined over a predetermined measurement time range so as to be representative of the pressure in the gas chamber 10 at the first or second time instant.

The method as set out in the above may be performed prior to that the insulation component 20 is arranged in the power device 1.

Figure 4:
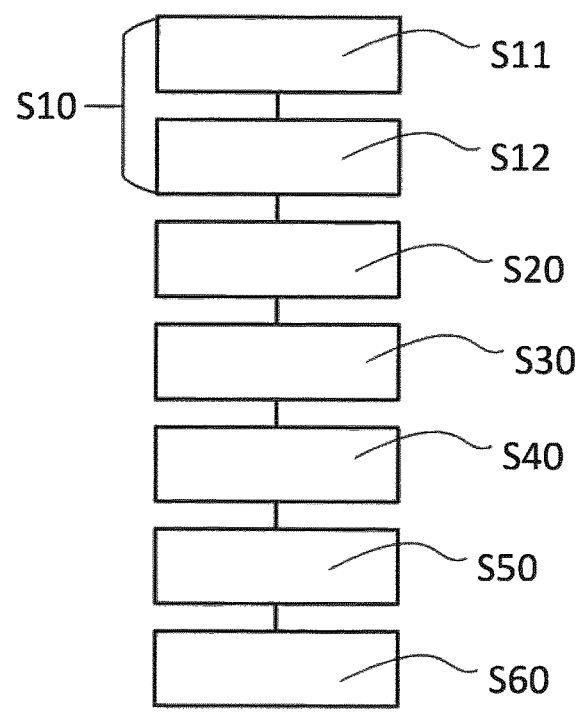
FIG. 4 is a schematical method scheme illustrating an example embodiment of the second aspect of the disclosure.

However, alternatively, and as illustrated in the example method of FIG. 4, the method step S10 may be performed with the insulation component 20 being comprised in the power device 1. Thus, the method step S10 may comprise filling the gas chamber 10 with the insulation gas S11 and
maintaining the insulation gas in the chamber 10 under the set of predetermined gas dissolving conditions of the power device 1 for at least the predetermined gas dissolving time period S12,
so as to form the power device 1 being in a delivery state wherein the insulation component 20 is pre-filled with dissolved insulation gas before connection to a power arrangement 100.

Further, the method may comprise, after the predetermined gas dissolving time period, setting the power device to a set of predetermined storage conditions S20. The set of storage conditions may for example comprise a storage pressure being less than the predetermine gas dissolving pressure and less than the predetermined installation pressure.

The method may comprise the step of closing the gas chamber 10 using a removable closure 40 so as to maintain the insulation gas in the chamber in the delivery state of the power component S30. The closing of the gas chamber 10 may be performed after the above-mentioned step S20 of setting the power device to a set of predetermined storage conditions, as exemplified in FIG. 4.

The steps S10 to S50 are thus involved in providing a power device in a delivery state prior to installing the power device in a power arrangement.

In a method for arranging the power device in a power arrangement, the method may further comprise a step S40 of storing and/or transporting the power device 1 including the removable closure 40, and a step S50 removing the removable closure 40 before installing the power device 1 in a power arrangement 100.

With a following step S60 of installing the power device in an electrical energy power arrangement adapted to be operated at the use conditions, the electrical energy power arrangement 100 is formed.

It is to be understood that the present disclosure is not limited to the embodiments described above and illustrated in the drawings; rather, the skilled person will recognize that many changes and modifications may be made within the scope of the appended claims.

The invention claimed is:

1. A power device for use in an electric energy power arrangement, said power device comprising:
   a gas chamber, wherein said gas chamber is adapted to, when in a use state in said electric energy power arrangement, contain an insulation gas therein under a set of use conditions, said set of use conditions comprising a use pressure, and at an installation time at a beginning of the use state the use pressure comprises a predetermined installation pressure of said insulation gas in said gas chamber; and
   an insulation component comprising a polymer material in which at least some of said insulation gas is soluble, wherein said insulation component is arranged in relation to said gas chamber so as to be at least partly exposed to said insulation gas when the power device is in said use state, wherein at a delivery time, said power device having a delivery state, being a state of said power device before the installation time at which the power device is installed in said electric energy power arrangement, wherein, in said delivery state, said insulation component comprises a pre-filled amount of the insulation gas being dissolved in the polymer material of the insulation component under a set of predetermined gas dissolving conditions for at least a predetermined gas dissolving time period before the delivery time, wherein said predetermined gas dissolving conditions comprise a predetermined gas dissolving pressure being greater than said predetermined installation pressure, wherein when the power device is in said delivery state, said gas chamber comprises said insulation gas under a set of delivery conditions, wherein said set of delivery conditions comprises a delivery pressure, said delivery pressure being lower than said installation pressure, and wherein said set of predetermined gas dissolving conditions and said predetermined gas dissolving time period is such that the insulation component comprises the pre-filled amount of the insulation gas being such that the use pressure of the insulation gas in said gas chamber follows a generally linear decay from said installation pressure at the installation time, when subject to said use conditions, proportional to the time elapsed from said installation time.

2. The power device according to claim 1, wherein said generally linear decay is such that, using a first pressure difference being a difference between said predetermined installation pressure and a first pressure value representative of a first pressure of the use pressure in said gas chamber at a first time after said installation time, and a second pressure difference being a difference between said first pressure value and a second pressure value, said second pressure value being representative of a second pressure of the use pressure in said gas chamber at a second time after the installation time, the second time after the first time, wherein a first time difference between the first time and the installation time is equal to a second time difference between the second time and the first time, and wherein said second pressure difference deviates by less than 10% from said first pressure difference.

3. The power device according to claim 2, wherein said first pressure value is a first average value as determined over a first predetermined measurement time range so as to be representative of the use pressure in the gas chamber at said first time, and/or wherein said second pressure value is a second average value as determined over a first predetermined measurement time range so as to be representative of the use pressure in the gas chamber at said second time.

4. The power device according to claim 2, wherein the first time difference is at least 5 days.

5. The power device according to claim 1, wherein said insulation gas comprises SF6 gas, CO2 gas, O2 gas and/or N2 gas.

6. The power device according to claim 1, said insulation gas comprises CO2 gas.

7. The power device according to claim 1, wherein said polymer material is an epoxy material.

8. A method for arranging a power device according to claim 1, comprising, installing said power device in an electrical energy power arrangement adapted to be operated at said set of use conditions.

9. An electric energy power arrangement, comprising one or more power devices, out of which each of at least one of the one or more power devices is in accordance with claim 1.

10. A method for manufacturing a power device for subsequent installation in an electric energy power arrangement, the power device comprising:
a gas chamber, wherein said gas chamber is adapted to, when in a use state in said electric energy power arrangement, contain an insulation gas therein under a set of use conditions, the set of use conditions comprise a use pressure, and at an installation time at a beginning of the use state said use pressure comprises a predetermined installation pressure of said insulation gas in said gas chamber; and an insulation component being arranged in relation to said gas chamber so as to be at least partly exposed to said insulation gas when the power device is in said use state, said insulation component comprising a polymer material in which at least some of said insulation gas is soluble, and the method comprising the step of:
prior to installing said power device in said use state, subjecting said insulation component to said insulation gas under a set of predetermined gas dissolving conditions for at least a predetermined gas dissolving time period, wherein said predetermined gas dissolving conditions comprise a predetermined gas dissolving pressure being greater than said predetermined installation pressure, such that said insulation component is prefilled with an amount of said insulation gas being dissolved in the polymer material of the insulation component, and wherein said set of predetermined gas dissolving conditions and said predetermined gas dissolving time period is such that the insulation component is pre-filled with said amount of said insulation gas being such that the use pressure of the insulation gas in said gas chamber follows a generally linear decay from said predetermined installation pressure at an installation time, when subject to said set of use conditions.

11. The method according to claim 10, further comprising forming said power device that comprises said insulation component before said step of subjecting said insulation component to said insulation gas under the set of predetermined gas dissolving conditions for said at least said predetermined gas dissolving time period.

12. The method according to claim 10, wherein said step of subjecting the insulation component to said insulation gas under said set of predetermined gas dissolving conditions for said at least said at least said predetermined gas dissolving time period is performed with the insulation component being comprised in said power device and comprises:

filling said gas chamber with said insulation gas and maintaining said insulation gas in said gas chamber under said set of predetermined gas dissolving conditions of said power device for said at least said predetermined gas dissolving time period, so as to form said power device being in a delivery state before said use state wherein said insulation component comprises an amount of the pre-filled of said insulation gas being dissolved in the polymer material of the insulation component before connection to the electric energy power arrangement.

13. The method according to claim 10, wherein said set of predetermined gas dissolving conditions further comprises a predetermined gas dissolving temperature.

14. The method according to claim 13, wherein said set of use conditions further comprises a predetermined use temperature range and said predetermined gas dissolving temperature is higher than said predetermined use temperature range.

15. The method according to claim 10, comprising the step of, after said at least said predetermined gas dissolving time period, setting said power device to a set of predetermined storage conditions.

16. The method according to claim 15, wherein the set of predetermined storage conditions comprises a storage pressure being less than said predetermined gas dissolving pressure.

17. The method according to claim 15, wherein the set of predetermined storage conditions comprises a storage pressure being less than said predetermined installation pressure.

18. The method according to claim 10, wherein said insulation gas comprises $CO_2$ gas.

19. The method according to claim 10, wherein said polymer material is an epoxy material.

\* \* \* \* \*